United States Patent
Matsumura et al.

(10) Patent No.: US 12,526,107 B2
(45) Date of Patent: Jan. 13, 2026

(54) TERMINAL, RADIO COMMUNICATION METHOD, BASE STATION, AND SYSTEM FOR CONFIGURING CHANNEL STATE INFORMATION REPORT

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Shaozhen Guo, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 274 days.

(21) Appl. No.: 17/921,237

(22) PCT Filed: Apr. 30, 2020

(86) PCT No.: PCT/JP2020/018308
§ 371 (c)(1),
(2) Date: Oct. 25, 2022

(87) PCT Pub. No.: WO2021/220482
PCT Pub. Date: Nov. 4, 2021

(65) Prior Publication Data
US 2023/0188287 A1   Jun. 15, 2023

(51) Int. Cl.
*H04L 5/00*   (2006.01)
*H04W 24/10*   (2009.01)

(52) U.S. Cl.
CPC ........... *H04L 5/0051* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 11,671,149 B2 * | 6/2023 | Chen | H04B 7/0617 375/267 |
| 2017/0317866 A1 | 11/2017 | Stirling-Gallacher et al. | |
| 2018/0262313 A1 * | 9/2018 | Nam | H04L 5/0044 |
| 2021/0399865 A1 * | 12/2021 | Cao | H04B 7/0691 |

(Continued)

FOREIGN PATENT DOCUMENTS

JP   2019-521543 A   7/2019

OTHER PUBLICATIONS

International Search Report issued in PCT/JP2020/018308 on Dec. 15, 2020 (2 pages).

(Continued)

*Primary Examiner* — Diane L Lo
(74) *Attorney, Agent, or Firm* — Osha Bergman Watanabe & Burton LLP

(57) ABSTRACT

A terminal according to one aspect of the present disclosure includes a control section that determines a panel corresponding to a reference signal for measurement (Sounding Reference Signal (SRS)) resource set or an SRS resource, and a transmitting section that performs SRS transmission in the SRS resource set or the SRS resource by using the determined panel and transmits a report for the determined panel corresponding to the SRS resource set or the SRS resource. According to one aspect of the present disclosure, it is possible to appropriately determine a correspondence relationship between a panel and an SRS.

4 Claims, 17 Drawing Sheets

(56) References Cited

U.S. PATENT DOCUMENTS

2022/0014957 A1\* 1/2022 Guo .................... H04B 7/0626
2022/0166468 A1\* 5/2022 Go ....................... H04B 7/0404

OTHER PUBLICATIONS

Written Opinion of the International Searching Authority issued in PCT/JP2020/018308 on Dec. 15, 2020 (3 pages).
Fraunhofer IIS, Fraunhofer HHI; "Enhancements on UE multi-beam operation"; 3GPP TSG RAN WG1 Meeting #97, R1-1907052; Reno, USA; May 13-17, 2019 (6 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

```
SRS-SpatialRelationInfo ::= SEQUENCE {
    servingCellId    ServCellIndex    OPTIONAL,    -- Need S
    referenceSignal    CHOICE {
        ssb-Index        SSB-Index,
        csi-RS-Index     NZP-CSI-RS-ResourceId,
        srs    SEQUENCE {
            resourceId    SRS-ResourceId,
            uplinkBWP     BWP-Id
        }
    }
}
```

FIG. 1

```
SRS-ReportConfig ::=            SEQUENCE {
    reportConfigId              SRS-ReportConfigId,
    reportConfigType            CHOICE {
        periodic                    SEQUENCE {
            reportPeriodicityAndOffset
            resource
        },
        semiPersistentOnPUCCH       SEQUENCE {
            reportPeriodicityAndOffset
            resource
        },
        aperiodic                   SEQUENCE {
        }
        ...
    }
}
```

```
CSI-ReportConfig ::=        SEQUENCE {
    reportConfigId          CSI-ReportConfigId,
    ...
    reportQuantity          CHOICE {
        ...
        panelReportForSRS       SEQUENCE {
            SRSresourceForReport SRSresourceSetID
        }
    }
    ...
}
```

FIG. 4B

```
SRS-ReportConfig ::=        SEQUENCE {
    reportConfigId          SRS-ReportConfigId,
    SRSresourceForReport    SRS-ResourceSetID
    reportConfigType        CHOICE {
        periodic            SEQUENCE {
            reportPeriodicityAndOffset
            resource
        },
        semiPersistentOnPUCCH   SEQUENCE {
            reportPeriodicityAndOffset
            resource
        },
        aperiodic           SEQUENCE {
        }
    }
    ...
}
```

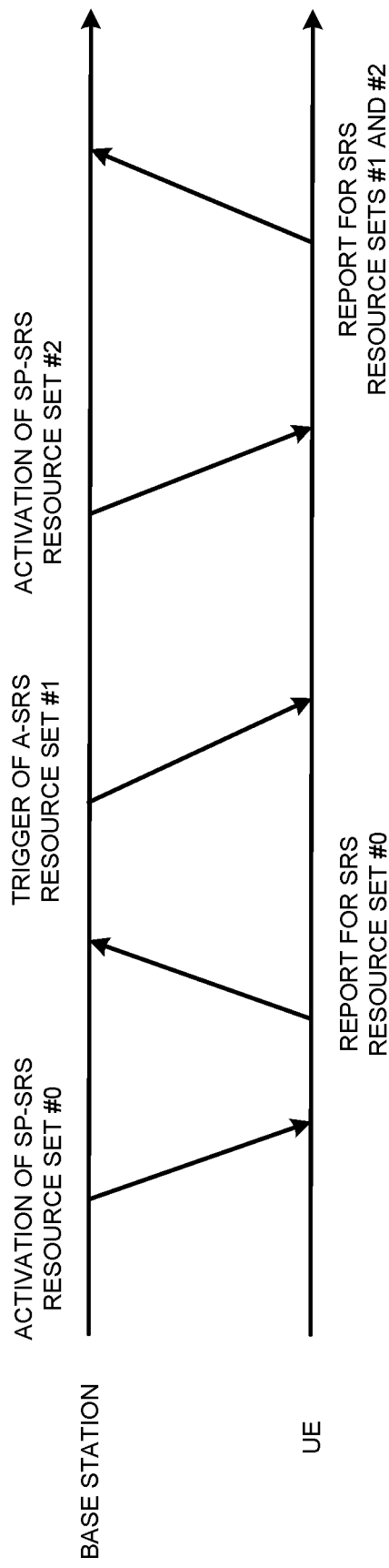
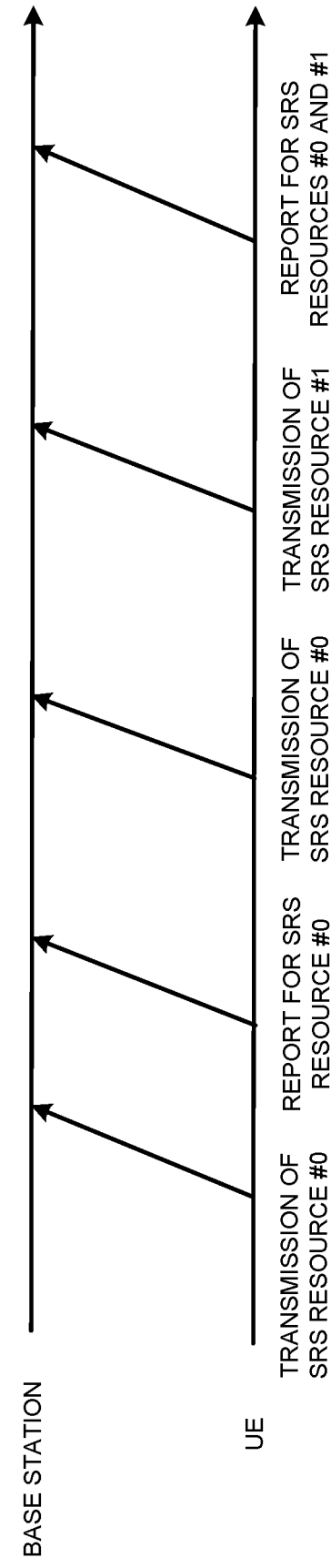

FIG. 8A
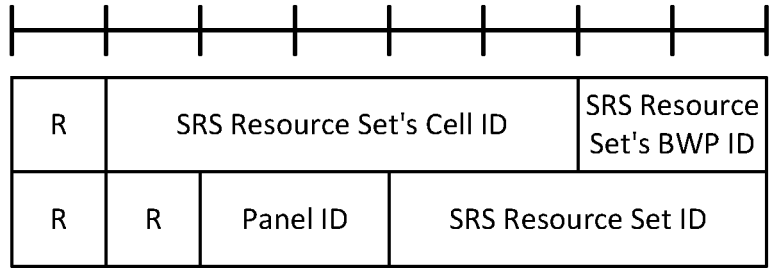
FIG. 8B
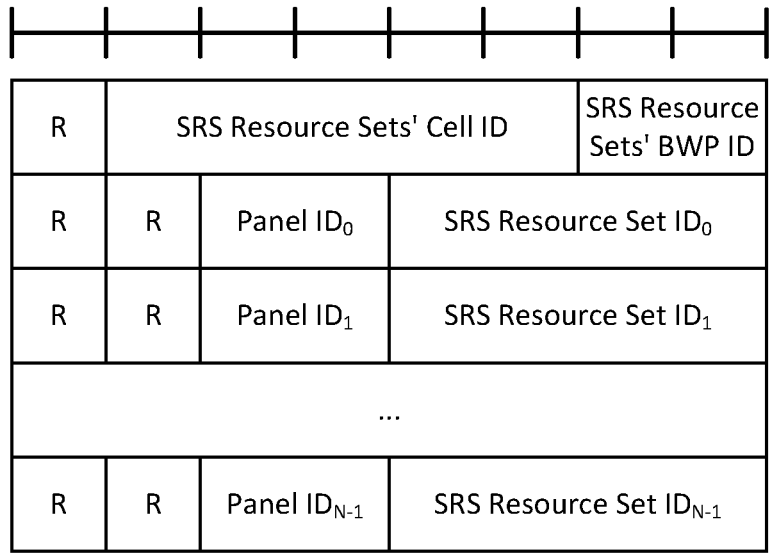
FIG. 8C
| CSI report number | CSI fields |
|---|---|
| CSI report #n | SRS resource set ID |
| | Panel ID |

FIG. 9A
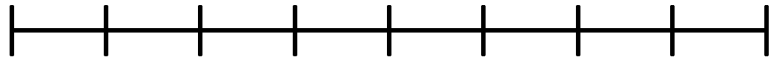
FIG. 9B
FIG. 9C
| CSI report number | CSI fields |
|---|---|
| CSI report #n | SRS resource set ID |
| | Panel ID #1 |
| | Panel ID #2 |

FIG. 10A

| R | SRS Resources' Cell ID | SRS Resources' BWP ID |
|---|---|---|
| R | SRS Resource ID$_0$ | |
| R | SRS Resource ID$_1$ | |
| ... | | |
| R | SRS Resource ID$_{N-1}$ | |
| Panel ID$_{N-1}$ | ... Panel ID$_1$ | Panel ID$_0$ |

FIG. 10B

| CSI report number | CSI fields |
|---|---|
| CSI report #n | SRS resource ID #1 |
| | SRS resource ID #2 |
| | Panel ID #1 |
| | Panel ID #2 |

| panels |
|---|
| Panel#1 -> deactivated |
| Panel#2 -> activated |
| Panel#3 -> activated |
| Panel#4 -> deactivated |

| Indication in report | Panel |
|---|---|
| 0 | Panel #1 |
| 1 | Panel #2 |
| 2 | Panel #3 |
| 3 | Panel #4 |

FIG. 12B

| Indication in report | Panel |
|---|---|
| 0 | Panel #2 |
| 1 | Panel #3 |

| CSI report number | CSI fields |
|---|---|
| CSI report #n | SRS resource set ID #1 |
| | SRS resource set ID #2 |

FIG. 13

TERMINAL, RADIO COMMUNICATION METHOD, BASE STATION, AND SYSTEM FOR CONFIGURING CHANNEL STATE INFORMATION REPORT

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In NR, a reference signal for measurement (Sounding Reference Signal (SRS)) is used for various purposes. An SRS in NR is used not only for uplink (UL) CSI measurement but also downlink (DL) CSI measurement, beam management, and the like.

However, the study about a relationship between an SRS and a panel of a user terminal (User Equipment (UE)) has not illustrated advancement until now. Unless this relationship is clarified, a base station cannot know whether a given SRS and another SRS are transmitted by using the same panel or transmitted by using different panels. In this case, an SRS measurement result cannot be used appropriately in the base station, and hence preferable scheduling is not performed, which may cause deterioration in communication throughput, communication quality, and the like.

Thus, an object of the present disclosure is to provide a terminal, a radio communication method, and a base station that enable appropriate determination of a correspondence relationship between a panel and an SRS.

Solution to Problem

A terminal according to one aspect of the present disclosure a control section that determines a panel corresponding to a reference signal for measurement (Sounding Reference Signal (SRS)) resource set or an SRS resource; and a transmitting section that performs SRS transmission in the SRS resource set or the SRS resource by using the determined panel and transmits a report for the determined panel corresponding to the SRS resource set or the SRS resource.

Advantageous Effects of Invention

According to one aspect of the present disclosure, it is possible to appropriately determine a correspondence relationship between a panel and an SRS.

BRIEF DESCRIPTION OF DRAWINGS

FIG. 1 is a diagram to illustrate an example of spatial relation information of an SRS

FIG. 3 is a diagram to illustrate an example of an SRS report configuration according to Embodiment 1.1;

FIGS. 4A and 4B are diagrams to illustrate examples of a configuration of an SRS resource set for reporting;

FIGS. 5A and 5B are diagrams to illustrate examples of determination of SRS resource sets/SRS resources for reporting, based on a given rule;

FIGS. 8A to 8C are diagrams to illustrate examples of a panel report;

FIGS. 9A to 9C are diagrams to illustrate examples of the panel report;

FIGS. 10A and 10B are diagrams to illustrate examples of the panel report;

FIG. 11 is a diagram to illustrate a configuration indicating whether each panel is activated or deactivated;

FIGS. 12A and 12B are diagrams to illustrate examples of mapping of a panel ID field and panels;

FIG. 13 is a diagram to illustrate an example of the panel report;

DESCRIPTION OF EMBODIMENTS (SRS)

Figure 2:
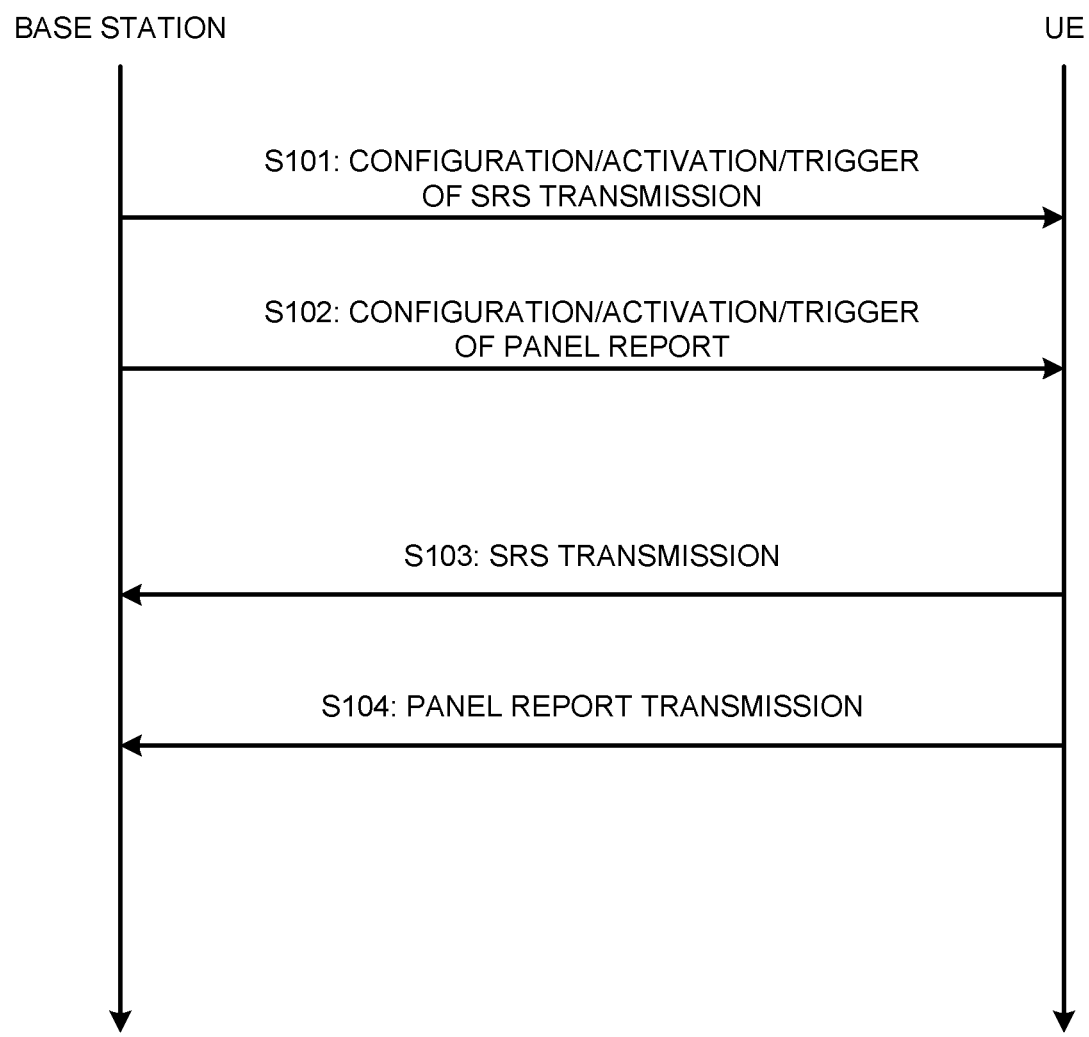
FIG. 2 is a diagram to illustrate an example of a procedure according to Embodiment 1.1.

In NR, a reference signal for measurement (Sounding Reference Signal (SRS)) is used for various purposes. An SRS in NR is used not only for uplink (UL) CSI measurement, which is also used in existing versions of LTE (LTE Rel. 8 to Rel. 14), but also downlink (DL) CSI measurement, beam management, and the like.

A UE may be configured with one or a plurality of SRS resources. Each SRS resource may be identified by an SRS resource index (SRI).

Each SRS resource may include one or a plurality of SRS ports (may correspond to one or a plurality of SRS ports). For example, the number of ports per SRS may be one, two, four, or the like.

The UE may be configured with one or a plurality of SRS resource sets. One SRS resource set may be associated with a given number of SRS resources. The UE may commonly use a higher layer parameter for an SRS resource(s) included in one SRS resource set. Note that a resource set in the present disclosure may be interpreted as a set, a resource group, a group, and the like.

Information related to an SRS resource or a resource set may be configured for the UE by using higher layer signaling or physical layer signaling, or a combination of these.

Note that, in the present disclosure, for example, the higher layer signaling may be any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

SRS configuration information (for example, an RRC information element "SRS-Config") may include SRS resource set configuration information, SRS resource configuration information, and the like.

The SRS resource set configuration information (for example, an RRC parameter "SRS-ResourceSet") may include information of an SRS resource set ID (Identifier) (SRS-ResourceSetId), a list of SRS resource IDs (SRS-ResourceId) used in the resource set, an SRS resource type (resourceType), and usage of the SRS.

Here, the SRS resource type may indicate time domain behavior (same time domain behavior) of the SRS resource configuration and may indicate any of a periodic SRS (P-SRS), a semi-persistent SRS (SP-SRS), and an aperiodic SRS (A-SRS). Note that the UE may transmit a P-SRS and an SP-SRS periodically (or periodically after activation). The UE may transmit an A-SRS according to an SRS request of DCI.

The usage of the SRS (an RRC parameter "usage," an L1 (Layer-1) parameter "SRS-SetUse") may be, for example, beam management (beamManagement), codebook, non-codebook, antenna switching (antennaSwitching), or the like. For example, an SRS of codebook or non-codebook usage may be used for determination of a precoder for a codebook-based or non-codebook-based uplink shared channel (Physical Uplink Shared Channel (PUSCH)) transmission, based on an SRI.

For an SRS of beam management usage, it may be assumed that only one SRS resource in each SRS resource set can be transmitted in a given time instant (given time instant). Note that, in a case where a plurality of SRS resources corresponding to the same time domain behavior belong to different SRS resource sets in the same Bandwidth Part (BWP), these SRS resources may be transmitted at the same time.

The SRS resource configuration information (for example, an RRC parameter "SRS-Resource") may include an SRS resource ID (SRS-ResourceId), the number of SRS ports, an SRS port number, transmission Comb, SRS resource mapping (for example, time and/or frequency resource position, resource offset, resource periodicity, the number of repetitions, the number of SRS symbols, an SRS bandwidth, and the like), hopping related information, an SRS resource type, a sequence ID, spatial relation information, and the like.

The UE may switch the Bandwidth Part (BWP) or may switch the antenna for transmitting an SRS for each slot. The UE may apply at least one of intra-slot hopping and inter-slot hopping to the SRS transmission.

(Spatial Relation)

In NR, the UE may control transmission processing (for example, transmission, mapping, precoding, modulation, and coding) of at least one of an uplink channel and signal (which may be described as a "channel/signal"; similarly, "A/B" may be interpreted as "at least one of A and B" below), based on a given spatial relation.

Note that the spatial relation may be interpreted as quasi-co-location (QCL), QCL assumption, a Transmission Configuration Indication state (TCI state), a beam, and the like.

The spatial relation to be applied to a given channel/signal may be specified by spatial relation information (SRI) notified (configured) by using higher layer signaling. SRS spatial relation information (for example, an RRC parameter "spatialRelationInfo") may indicate spatial relation information between a given reference signal (RS) and an SRS.

The given reference signal may be at least one of a synchronization signal block (SSB), a channel state information-reference signal (CSI-RS), and a reference signal for measurement (Sounding Reference Signal (SRS)). Here, the SSB may be referred to as a synchronization signal/broadcast channel (Synchronization Signal/Physical Broadcast Channel (SS/PBCH)) block.

FIG. 1 is a diagram to illustrate an example of spatial relation information of an SRS. This example is described by using the Abstract Syntax Notation One (ASN. 1) description (note that this is only for illustrative purposes and is hence not full description).

In this example, the SRS spatial relation information (for example, an RRC information element (IE) "SRS-SpatialRelationInfo") may include at least one of an SSB index, a CSI-RS resource ID, and an SRS resource ID as an index of the given reference signal (a reference RS (a parameter "referenceSignal")).

Note that, in the present disclosure, an SSB index, an SSB resource ID, and an SSB Resource Indicator (SSBRI) may be interchangeably interpreted. A CSI-RS index, a CSI-RS resource ID, and a CSI-RS Resource Indicator (CRI) may be interchangeably interpreted. An SRS index, an SRS resource ID, and an SRI may be interchangeably interpreted.

A configured SRI may include at least one of an SSB index, a CSI-RS resource ID, and an SRS resource ID as the index of the given RS. The SRI may include a serving cell index, a bandwidth part (BWP) ID, and the like corresponding to the given RS.

Note that, in the present disclosure, an index, an ID, an indicator, a resource ID, and the like may be interchangeably interpreted.

In a case where the UE is configured, for a given SRS resource, with spatial relation information related to an SSB or a CSI-RS and an SRS, the UE may transmit the SRS resource by using the same spatial domain filter as a spatial domain filter for reception of the SSB or the CSI-RS. In other words, in this case, the UE may assume that a UE receive beam for the SSB or the CSI-RS and a UE transmit beam for the SRS are the same.

In a case where the UE is configured, for a given SRS (target SRS) resource, with spatial relation information related to another SRS (reference SRS) and the given SRS (target SRS), the UE may transmit the target SRS resource by using the same spatial domain filter as a spatial domain filter for transmission of the reference SRS. In other words, in this case, the UE may assume that a UE transmit beam for the reference SRS and a UE transmit beam for the target SRS are the same.

Note that a spatial domain filter for transmission of the base station, a downlink spatial domain transmission filter, and a transmit beam of the base station may be interchangeably interpreted. A spatial domain filter for reception of the base station, an uplink spatial domain receive filter, and a receive beam of the base station may be interchangeably interpreted.

A spatial domain filter for transmission of the UE, an uplink spatial domain transmission filter, and a transmit beam of the UE may be interchangeably interpreted. A spatial domain filter for reception of the UE, a downlink spatial domain receive filter, and a receive beam of the UE may be interchangeably interpreted.

Note that spatial relation information (SRI) may correspond to a beam. For example, the UE may assume that UL transmissions corresponding to different SRI are transmitted by using different beams.

A beam indication for an uplink control channel (Physical Uplink Control Channel (PUCCH)) may be configured by higher layer signaling. For example, in a case where PUCCH spatial relation information includes a single spatial relation information (SpatialRelationInfo) parameter, the UE may apply the parameter thus configured to the PUCCH. In a case where the PUCCH spatial relation information includes more than one spatial relation information parameter, a parameter to be applied to (activated for) the PUCCH may be determined based on a MAC CE.

Note that the spatial relation information of a PUCCH may be information in which an SRS is interpreted as a PUCCH in the above-described spatial relation information of an SRS, and hence description is not repeated.

A beam indication for a PUSCH may be determined based on an SRS Resource Indicator (SRI) field included in DCI. The UE may transmit the PUSCH by using the same transmit beam as that for a corresponding SRS among SRSs configured by a higher layer, based on specified SRI. Note that this may similarly applied to a beam indication for an SRS For example, the UE configured with codebook-based PUSCH transmission may determine (select) an SRS resource included in the SRS resource set having codebook as SRS usage, based on the SRI field of DCI.

The UE configured with non-codebook-based PUSCH transmission may determine (select) an SRS resource included in the SRS resource set having non-codebook as SRS usage, based on the SRI field of DCI.

Note that the number of SRS resources included in the SRS resource set having codebook as usage and the number of SRS resources included in the SRS resource set having non-codebook as usage may be different from each other, and the former may be two while the latter may be four, or the like, for example. In this case, the SRI field size may be 1 bit for the former while 2 bits for the latter, or the like.

(Multi Panel)

For future radio communication systems (for example, Rel. 17 NR), uplink (UL) beam selection for a UE including a plurality of panels (multi panel) is under study.

For example, in a case where the UE has capability of beam correspondence (BC) (for example, an RRC parameter "beamCorrespondenceWithoutUL-BeamSweeping"), the UE may autonomously determine an appropriate UL beam, based on DL measurement (for example, a DL reference signal measurement) without UL beam sweeping.

In a case where the UE does not have the capability, the UE may perform UL beam sweeping. For an SRS for beam management usage, a beam is generally autonomously determined by the UE to be used for SRS-based beam sweeping. The SRS for beam management usage may not necessarily be configured/specified with spatial relation information by the base station.

For an SRS having beam management usage, it may be assumed that only one SRS resource in each SRS resource set can be transmitted in a given time instant, as described above.

However, the study about the relationship between an SRS and a panel of a UE has not indicated advancement until now. Unless this relationship is clarified, a base station cannot know whether a given SRS and another SRS are transmitted by using the same panel or transmitted by using different panels. In this case, an SRS measurement result cannot be used appropriately in the base station, and hence preferable scheduling is not performed, which may cause deterioration in communication throughput, communication quality, and the like.

In view of these, the inventors of the present invention came up with the idea of a method for appropriately performing panel specific SRS transmission.

Embodiments according to the present disclosure will be described in detail with reference to the drawings as follows. The radio communication methods according to respective embodiments may each be employed individually, or may be employed in combination.

Note that, in the present disclosure, activation, deactivation, indication, selection, update, determination, and the like may be interchangeably interpreted. In the present disclosure, a sequence, a list, a set, a group, and the like may be interchangeably interpreted.

Note that, in the present embodiment, a panel, an Uplink (UL) transmission entity, a TRP, spatial relation information (SRI), a spatial relation, a control resource set (CORESET), a PDSCH, a codeword, a base station, a given antenna port (for example, a demodulation reference signal (DMRS) port), a given antenna port group (for example, a DMRS port group), a given group (for example, a code division multiplexing (CDM) group, a given reference signal group, a CORESET group), a CORESET pool, and the like may be interchangeably interpreted.

A panel Identifier (ID) and a panel may be interchangeably interpreted. In other words, a TRP ID and TRP may be interchangeably interpreted, and a CORESET group ID and a CORESET group may be interchangeably interpreted, for example. An ID and an index may be interchangeably interpreted.

In the embodiments below, an SRS resource set/SRS resource may be interpreted as an SRS resource set/SRS resource for specific usage (for example, codebook, non-codebook, or beam management), an SRS resource set/SRS resource for the same usage, and the like, and vice versa.

Note that a panel in the present disclosure may be interpreted as an active panel. A panel ID in the present disclosure may be interpreted as an SRS resource set group ID, an antenna group ID, another ID, and the like, and vice versa. The panel ID may be transparent for the base station (gNB). In this case, the base station can know which SRS resource sets are transmitted in the same panel or different panels, for example.

(Radio Communication Method)

In the present disclosure, embodiments in which the UE determines a relationship between an SRS and a panel to report about the relationship to the base station will be described below. This report may be referred to as a panel report and the like. Note that a panel report may be transmitted in a case where the base station configures/indicates a relationship between an SRS and a panel.

First Embodiment

A first embodiment relates to a method of triggering a panel report.

Embodiment 1.1

In Embodiment 1.1, a panel report is triggered for a UE by a base station.

In Embodiment 1.1, the UE may report a panel report as a kind of CSI report (Embodiment 1.1.1). In this case, a mechanism (a trigger method and the like) of a CSI report can be used.

In a case where a parameter related to a panel is configured as report quantity (reportQuantity) of a CSI report, the UE may include information of a panel to be used for transmission of an SRS in the CSI report.

The priority of the CSI report including the panel report may be as high as that of existing report quantity (for example, an L1-RSRP or an L1-SINR), may be the next highest to that of the existing report quantity (for example, the L1-RSRP or the L1-SINR), or may be the highest.

The value of the priority of the CSI report is defined by using a function $Pri_{iCSI}(y, k, c, s)$ in Rel. 15, and is k=0 in a case where the CSI report includes the L1-RSRP/SINR while being k=1 otherwise. For example, in a case where the CSI report includes a panel report, k may be k=0.5.

In Embodiment 1.1, the UE may report a panel report as a report (for example, which may be referred to as an SRS report) different from a CSI report (Embodiment 1.1.2).

The UE may be configured with a report type of periodic/semi-persistent/aperiodic for the SRS report.

For a periodic/semi-persistent SRS report, the UE may be configured with a reporting periodicity, a time offset, a resource for reporting, and the like, for example. The semi-persistent SRS report may be activated for the UE by a MAC CE.

The aperiodic SRS report may be triggered for the UE by DCI. The UE may determine a resource for reporting, based on the DCI (triggering DCI)

Configuration information related to an SRS report may be configured for the UE by an SRS report configuration (an RRC information element "SRS-ReportConfig"), for example.

The above is summarized as follows. In Embodiment 1.1, when a configuration for a panel report (a CSI report configuration, an SRS report configuration, or the like) is configured/activated/triggered, the UE reports the panel report.

For the simplicity, in the present disclosure, an SRS report, a CSI report (including panel information for an SRS), and a panel report may be interchangeably interpreted below.

FIG. 2 is a diagram to illustrate an example of a procedure according to Embodiment 1.1. In step S101, the UE receives configuration/activation/trigger of SRS transmission from the base station. In step S102, the UE receives configuration/activation/trigger of a panel report from the base station.

In step S103, the UE transmits an SRS configured/activated/triggered in step S101. In step S104, the UE transmits the panel report configured/activated/triggered in step S102 and related to the SRS transmitted in step S103.

FIG. 3 is a diagram to illustrate an example of an SRS report configuration according to Embodiment 1.1. In the present example, periodic/semi-persistent (semiPersistentOnPUCCH (which may be semiPErsistentOnPUSCH))/aperiodic is configured as a report type (report configuration type) by using an RRC parameter reportConfigType. For a periodic/semi-persistent SRS report, reportPeriodicityAndOffset indicating the periodicity and the time offset of a report and "resource" indicating the resource for reporting may be configured.

[Method for Determining SRS for Reporting]

The UE may determine an SRS resource set/SRS resource for reporting (in other words, related to a panel to be reported), based on at least one of the followings:

(A) a configuration/notification from the base station;
(B) a given rule; and
(C) UE implementation.

For (A) above, for example, an SRS resource set/SRS resource for reporting may be configured by using a report configuration in RRC. FIGS. 4A and 4B are diagrams to illustrate examples of a configuration of an SRS resource set for reporting.

FIG. 4A corresponds to Embodiment 1.1.1. In FIG. 4A, "panelReportForSRS" indicating an SRS report (a panel report for an SRS) is included to be configurable as a report quantity (reportQuantity) in a CSI report configuration (CSI-ReportConfig). "panelReportForSRS" includes a parameter (here, "SRSresourceForReport") indicating an SRS resource set for reporting.

FIG. 4B corresponds to Embodiment 1.1.2. In FIG. 4B, an SRS report configuration (SRS-ReportConfig) includes a parameter (here, "SRSresourceForReport") indicating an SRS resource set for reporting.

Note that an example in which a single SRS resource set ID is configured in "SRSresourceForReport" in FIGS. 4A and 4B has been illustrated, but this is not restrictive. SRSresourceForReport may indicate a plurality of SRS resource set IDs or may indicate one or a plurality of SRS resource IDs. The UE reports an SRS report for one or more SRS resource set IDs/SRS resource IDs specified by SRSresourceForReport.

For (B) above, the given rule may be any one of the followings, for example:

a panel ID for a P-SRS resource set configured/SP-SRS resource set activated/A-SRS resource set triggered in a period from the last transmission (or transmission occasion) of an SRS report is reported; and a panel ID for a P-/SP-/A-SRS resource set transmitted in a period from the last transmission of an SRS report is reported.

These are different from each other in that the former uses, as a determination criterion, a configuration/activation command (MAC CE)/triggering DCI received by the UE while the latter uses, as a determination criterion, an SRS transmitted by the UE.

Note that an SRS resource set in these rules may be interpreted as an SRS resource set/SRS resource.

FIGS. 5A and 5B are diagrams to illustrate examples of determination of SRS resource sets/SRS resources for reporting, based on a given rule. In the present example, it is assumed that no SRS report is reported before the SRS reports illustrated in the drawings.

FIG. 5A corresponds to an example in which each configuration/activation command/triggering DCI is used as a determination criterion. In the first SRS report, the UE reports a panel related to SP-SRS resource set #0 activated before the first SRS report.

In the second SRS report, the UE reports panels related to A-SRS resource set #1 triggered and SP-SRS resource set #2 activated in the period after the first SRS report.

FIG. 5B corresponds to an example in which each SRS transmitted by the UE is used as a determination criterion. In the first SRS report, the UE reports a panel related to SRS resource #0 transmitted before the first SRS report.

In the second SRS report, the UE reports panels related to SRS resources #0 and #1 transmitted in a period after the first SRS report.

For (C) above, to avoid a difference in the number of panels included in an SRS report between the base station and the UE, the number of SRS resource sets/SRS resources for reporting may be determined in a specification in advance or may be configured through RRC for the UE.

According to Embodiment 1.1 described above, an SRS report can be suitably triggered, based on signaling of the base station.

Variations of Embodiment 1.1

The UE may trigger both an aperiodic SRS report (A-SRS report) and A-SRS transmission, based on a single (the same) DCI. Note that this A-SRS report may be an A-CSI report according to Embodiment 1.1.1 or may be an A-SRS report according to Embodiment 1.1.2.

For an A-SRS report and A-SRS transmission corresponding to the report (using a panel reported in the report), it may be assumed to follow at least one of the followings:
(1) the A-SRS transmission is always transmitted earlier than the A-SRS report;
(2) the A-SRS report is always transmitted earlier than the A-SRS transmission;
(3) no restriction is imposed on transmission order (depending on the configuration of the base station); and
(4) supporting of (1) and (2) above is based on UE capability.

Note that, for (4) above, the UE supporting both (1) and (2) above may follow (3) above.

In a case where assumption (2) above is applied, the base station can use the A-SRS report transmitted earlier, for reception/measurement of an A-SRS transmitted later. The UE following (2) above needs to determine a panel to use for A-SRS transmission and report the panel by an A-SRS report before the A-SRS transmission, and hence it is considered that the UE is required to have different UE capability from that of the UE following (1) above. Hence, the UE/base station may assume that (1) above is applied in a case where no UE capability as that in (4) above is reported.

Figure 6A:
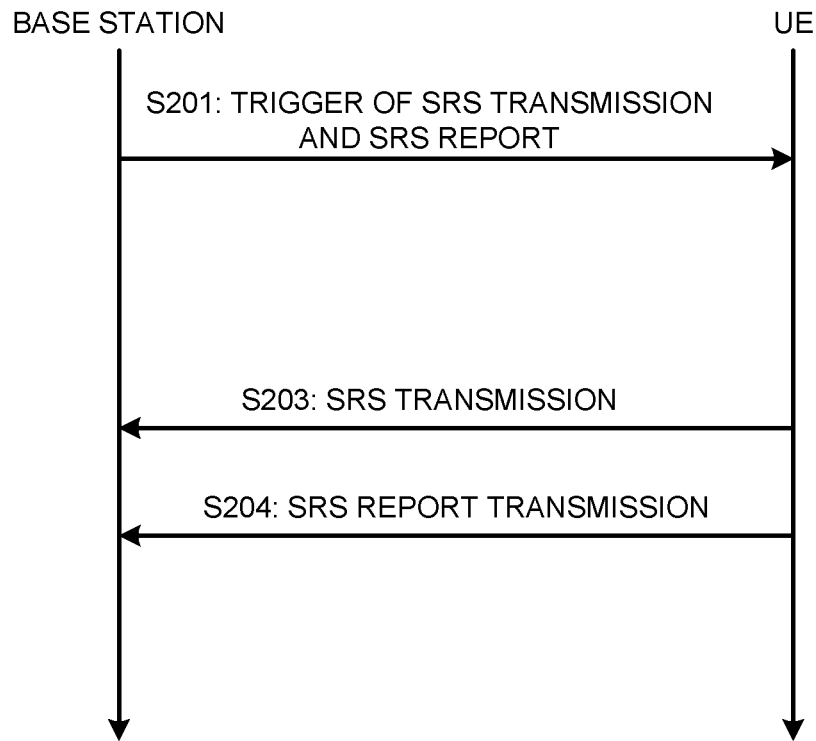
FIGS. 6A and 6B are diagrams to illustrate examples of restriction in an A-SRS report and A-SRS transmission corresponding to the report.
Figure 6B:
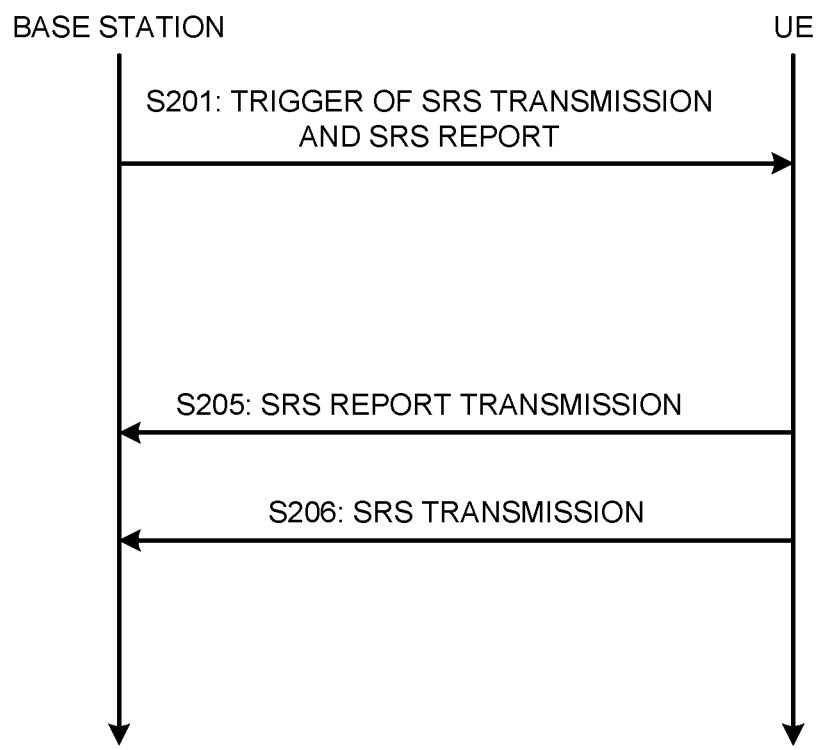

FIGS. 6A and 6B are diagrams to illustrate examples of restriction in an A-SRS report and A-SRS transmission corresponding to the report.

FIG. 6A corresponds to restriction (1) above. The UE, which has detected DCI triggering an A-SRS report and A-SRS transmission in step S201, performs the A-SRS transmission after a first offset from the detection of the DCI (step S203) and transmits the A-SRS report after a second offset from the detection of the DCI (step S204). In this example, the first offset is always smaller than the second offset.

FIG. 6B corresponds to restriction (2) above. The UE, which has detected DCI triggering an A-SRS report and A-SRS transmission in step S201, transmits the A-SRS report after the second offset from the detection of the DCI (step S205) and performs the A-SRS transmission after the first offset from the detection of the DCI (step S206). In this example, the second offset is always smaller than the first offset.

Note that the transmission timing (for example, slot or subslot) of the A-SRS report may use reception timing of triggering DCI as a criterion or may use transmission timing of a corresponding A-SRS as a criterion. The second offset may mean the offset from one timing from at least one of these.

"Earlier than" in (1) and (2) above may be interpreted as "the same as or earlier than," and vice versa.

Assumptions (1) to (4) above are not limited to a case where both an A-SRS report and A-SRS transmission are triggered by a single triggering DCI. Assumptions (1) to (4) above may be applied to a case where each of an A-SRS report and A-SRS transmission is triggered by a different triggering DCI.

Note that the UE may activate (trigger) both a semi-persistent SRS report and SP-SRS transmission, based on a single (the same) MAC CE. Note that this semi-persistent SRS report may be an SP-CSI report according to Embodiment 1.1.1 or may be an SP-SRS report according to Embodiment 1.1.2.

According to the variations of Embodiment 1.1 described above, it is possible to control both an SRS report and SRS transmission together by a single DCI (or MAC CE) and hence to suitably suppress an increase in communication overhead.

Embodiment 1.2

In Embodiment 1.2, a panel report is triggered by the UE. For example, in a case where at least one of the following trigger events occurs, the UE may determine that a panel report is triggered and transmit the panel report:
a case where a P-SRS resource set is configured;
a case where an SP-SRS resource set is activated;
a case where an A-SRS resource set is triggered;
a case where a P-SRS/SP-SRS/A-SRS resource set is transmitted; and
a case where the UE changes a panel for transmission of an SRS resource set/SRS resource.

The trigger event "case where . . . is configured (activated, triggered, or transmitted)" may be a case where a single SRS resource set/SRS resource is configured (activated, triggered, or transmitted) or a case where an SRS resource set/SRS resource is configured (activated, triggered, or transmitted) a given number of times. The given number of times may be determined in advance in a specification or may be configured by a higher layer parameter.

The trigger event "change of a panel" described last may depend on the implementation of the UE.

The UE may transmit the panel report by using a MAC CE. When the panel report is triggered, the UE may transmit a scheduling request (SR) of a PUSCH for transmitting the MAC CE, to the base station. Note that the SR may be a normal SR (defined in an existing specification) or may be an SR dedicated to the panel report (defined newly).

Figure 7:
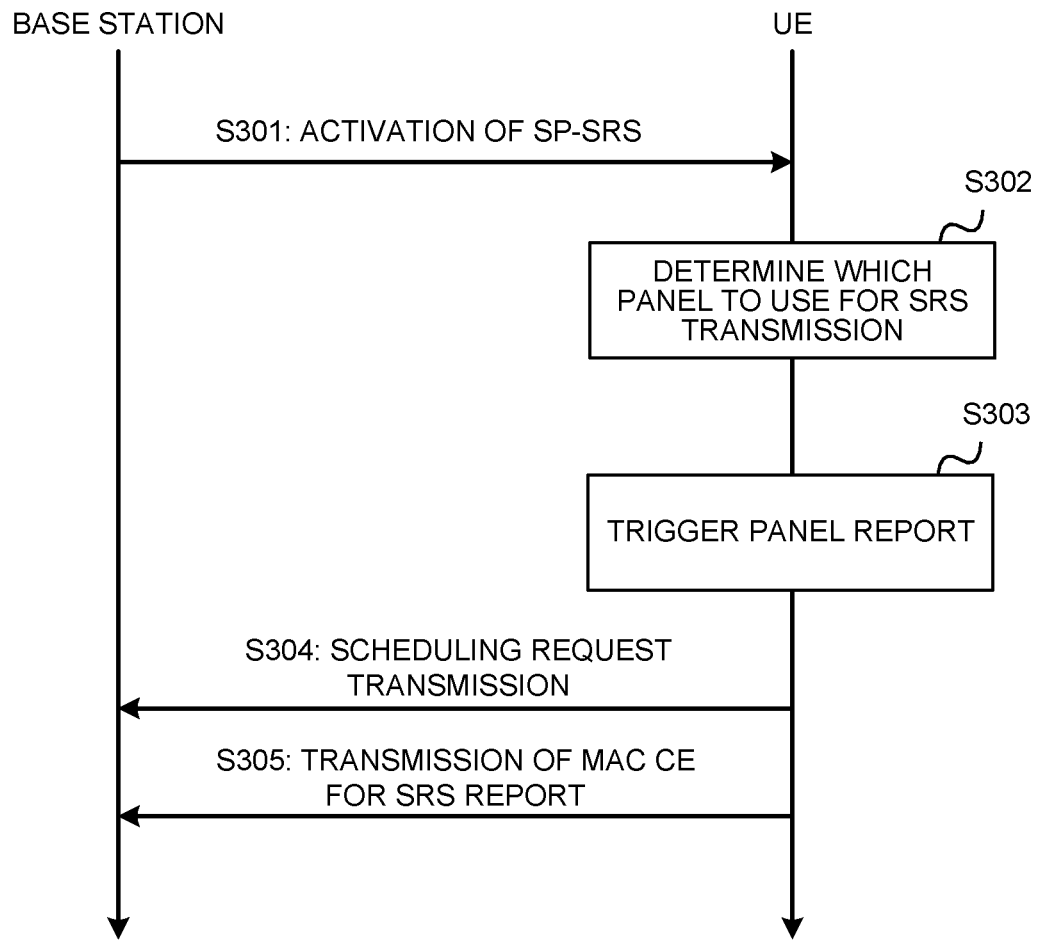
FIG. 7 is a diagram to illustrate an example of a procedure according to Embodiment 1.2.

FIG. 7 is a diagram to illustrate an example of a procedure according to Embodiment 1.2. In step S301, the UE receives an activation command (MAC CE) for SP-SRS transmission, from the base station. In step S302, the UE autonomously determines which panel is to be used for the SP-SRS transmission. In step S303, the UE triggers a panel report.

In step S304, the UE transmits a scheduling request for requesting a UL resource for transmission of the triggered panel report. Subsequently, in step S305, the UE may use a UL resource secured by the base station (for example, notified through DCI (UL grant)), to transmit a MAC CE for the panel report (SRS report) through a PUSCH.

Note that the MAC CE may include a single panel report for a single SRS resource set or SRS resource or may include a plurality of panel reports for a plurality of SRS resource sets/SRS resources. When a plurality of SRS resource sets are triggered, the UE may transmit a plurality of separate MAC CEs each including a single panel report or a single MAC CE including a plurality of panel reports.

Note that the UE may transmit the panel report by using UCI (PUCCH) instead of the MAC CE. In this case, a PUCCH resource for panel report reporting may be configured for the UE.

According to Embodiment 1.2 described above, the UE can suitably trigger an SRS report.

Second Embodiment

A second embodiment relates to a content of a panel report.

A panel ID may be reported for each SRS resource set. In this case, the UE may apply the same panel to all the SRS resources in each SRS resource set.

FIGS. 8A to 8C are diagrams to illustrate examples of the panel report.

FIG. 8A is a diagram to illustrate an example of a panel report related to a single SRS resource set. The panel report of this example is a MAC CE. The MAC CE may be referred to as a panel report MAC CE, an SRS report MAC CE, and the like. The MAC CE may include a cell ID (Serving Cell ID) for identifying a cell including a report-target SRS resource set, a BWP ID corresponding to a UL bandwidth part (Bandwidth Part (BWP)) including the report-target SRS resource set, an SRS resource set ID indicating the report-target SRS resource set, a panel ID related to the SRS resource set, and the like. Note that "R" indicates a reserved field.

FIG. 8B is a diagram to illustrate an example of a panel report related to a plurality of SRS resource sets. The same contents of the MAC CE in FIG. 8B as the contents of the MAC CE in FIG. 8A are not described to avoid overlapping description. FIG. 8B is different from FIG. 8A in that an i (i=0 to N−1)-th SRS resource set ID and an i-th panel ID corresponding to the i-th SRS resource set ID are included. This N may be defined in advance in a specification or may be configured by a higher layer parameter.

FIG. 8C is a diagram to illustrate another example of the panel report related to a single SRS resource set. The panel report of this example is a CSI report, and FIG. 8C indicates the mapping order of the CSI fields included in the CSI report (n-th CSI report #n).

The CSI report in FIG. 8C may include an SRS resource set ID indicating a report-target SRS resource set and a panel ID related to the SRS resource set.

Note that the SRS report set ID may not necessarily be included in this panel report. This is because, for example, in a case of employing method (A) or (B) for determining an SRS for reporting in Embodiment 1.1 or the like, the base station can know the SRS resource set ID corresponding to a panel report reported at given timing. Also for panel reports below, an SRS resource set ID may be omitted.

A panel ID may be reported for each SRS resource.

The UE may, for example, report a panel report including an SRS resource set ID and one or more panel IDs related to all the SRS resources in the SRS resource set. FIGS. 9A to 9C are diagrams to illustrate examples of the panel report.

FIG. 9A is a diagram to illustrate an example of a panel report related to a single SRS resource set. The same contents of the MAC CE in FIG. 9A as the contents of the MAC CE in FIG. 8A are not described to avoid overlapping description. FIG. 9A is different from FIG. 8A in that an SRS resource set ID and an i (i=0 to K−1)-th panel ID corresponding to an i-th SRS resource ID in the SRS resource set corresponding to the SRS resource set ID are included.

FIG. 9B is a diagram to illustrate an example of a panel report related to a plurality of SRS resource sets. The same contents of the MAC CE in FIG. 9B as the contents of the MAC CE in FIG. 8A are not described to avoid overlapping description. FIG. 9B is different from FIG. 8A in that an i (i=0 to N−1)-th SRS resource set ID and a j (j=0 to M−1)-th panel ID corresponding to M SRS resources in total included in each SRS resource set are included. For example, 0-th to (K−1)-th panel IDs may correspond to 0-th SRS resource set ID, while K-th to (L−1)-th panel IDs may correspond to the first SRS resource set ID. N may be defined in advance in a specification or may be configured by a higher layer parameter.

FIG. 9C is a diagram to illustrate another example of the panel report related to a single SRS resource set. The same contents of a CSI report in FIG. 9C as the contents of the CSI report in FIG. 8A are not described to avoid overlapping description. The CSI report in FIG. 9C may include an SRS resource set ID indicating a report-target SRS resource set and panel IDs (panel IDs #1 and #2) related to the two respective SRS resources in the SRS resource set.

The UE may, for example, report a panel report including an SRS resource set ID and a panel ID related to the SRS resource ID. FIGS. 10A and 10B are diagrams to illustrate examples of the panel report.

FIG. 10A is a diagram to illustrate an example of a panel report related to a plurality of SRS resource sets. The same contents of the MAC CE in FIG. 10A as the contents of the MAC CE in FIG. 8A are not described to avoid overlapping description. FIG. 10A is different from FIG. 8A in that an i (i=0 to N−1)-th SRS resource set ID and an i-th panel ID corresponding to the i-th SRS resource set ID are included. N may be defined in advance in a specification or may be configured by a higher layer parameter. N may be the number of SRS resources in a single SRS resource set or may be the total of the numbers of SRS resources included in a plurality of SRS resource sets.

FIG. 10B is a diagram to illustrate another example of the panel report related to a single SRS resource set. The same contents of a CSI report in FIG. 10B as the contents of the CSI report in FIG. 8A are not described to avoid overlapping description. The CSI report in FIG. 10B may include SRS resource IDs (here, SRS resource IDs #1 and #2) indicating report-target SRS resources and panel IDs (panel IDs #1 and #2) related to the respective SRS resources. In this case, for example, panel ID #1 relates to SRS resource ID #1.

Note that the SRS report IDs may not necessarily be included in the panel reports in FIGS. 10A and 10B. This is because, for example, in a case of employing method (A) or (B) for determining an SRS for reporting in Embodiment 1.1 or the like, the base station can know the SRS resource related to the SRS resource set ID corresponding to a panel report reported at given timing. Note that a configuration of explicitly including the SRS resource set ID corresponding to the SRS resource IDs may be used in FIGS. 10A and 10B.

[Value of Panel ID Field]

A value in the panel ID field included in a panel report may uniquely indicate a panel irrespective of whether the panel is active or not (may be configured to be able to represent (identify) all the panels of the UE) or may indicate only an active panel. This will be described with reference to FIGS. 11, 12A, and 12B.

FIG. 11 is a diagram to illustrate a configuration indicating whether each panel is activated or deactivated. FIG. 11 illustrates a configuration in a case where panels #1 and #4 are deactivated while panels #2 and #3 are activated. The UE may be configured (indicated or activated) with each panel being activated/deactivated, based on higher layer signaling (for example, RRC signaling or a MAC CE) or physical layer signaling (for example, DCI), or a combination of these.

FIG. 12A is a first example illustrating mapping of a panel ID field and panels. As illustrated in FIG. 12A, the UE may map values of the panel ID field to all panels.

FIG. 12B is a second example illustrating mapping of a panel ID field and panels. As illustrated in FIG. 11, activated panels are assumed to be panels #2 and #3. In this case, as illustrated in FIG. 12B, the UE maps the values of the field for a panel ID to panels #2 and #3 while not mapping any value of the field for a panel ID to panels #2 and #3, which are deactivated. With the configuration in FIG. 12B, the number of bits of the panel ID field can be suitably reduced.

As above, a "panel" in the present disclosure may be interpreted as an activated panel, an active panel, and the like, and vice versa.

[Case Where Panel ID Field is Not Included in Panel Report]

A panel report may not necessarily explicitly include a panel ID field. In a case where a panel report not including a panel ID field includes a plurality of SRS resource set IDs/SRS resource IDs, it may be assumed that this corresponds to any of the followings:

a plurality of SRS resource sets/SRS resources to be reported are transmitted by using the same panel (in other words, not transmitted at the same time); and a plurality of SRS resource sets/SRS resources to be reported are transmitted by using different panels (in other words, may be transmitted at the same time).

Which one of the above is applied may be defined in advance in a specification, may be configured for the UE through higher layer signaling, or may be determined according to UE capability.

FIG. 13 is a diagram to illustrate an example of the panel report. The CSI report in FIG. 13 includes SRS resource set IDs indicating report-target SRS resource sets (here, SRS resource set IDs #1 and #2) and does not include any panel ID.

It may be assumed that the base station that receives a panel report not including any panel ID knows the configuration of the panels of the UE and can use information related to whether different SRS resource sets/SRS resources are transmitted by using the same panel or different panels.

Note that, in a case where the panel report (Embodiment 1.1) triggered by the base station and the panel report (Embodiment 1.2) triggered by the UE are used in combination, the UE may report, only in a case where a relationship of panels for SRS resource sets/SRS resources is not configured/indicated, include and report panel IDs for the SRS resource sets/SRS resources in the panel reports.

For example, in a case where an SRS resource set/SRS resource is configured (activated, triggered, or transmitted) and a panel ID for this SRS resource set/SRS resource is not configured/indicated by the base station, the UE may trigger reporting of a panel report including the panel ID.

According to the second embodiment described above, the UE can appropriately report a panel report. The base station can appropriately understand which panel of the UE is used for transmission of an SRS, based on the reported panel report.

[Radio Communication System]

Hereinafter, a structure of a radio communication system according to one embodiment of the present disclosure will be described. In this radio communication system, the radio communication method according to each embodiment of the present disclosure described above may be used alone or may be used in combination for communication.

Figure 14:
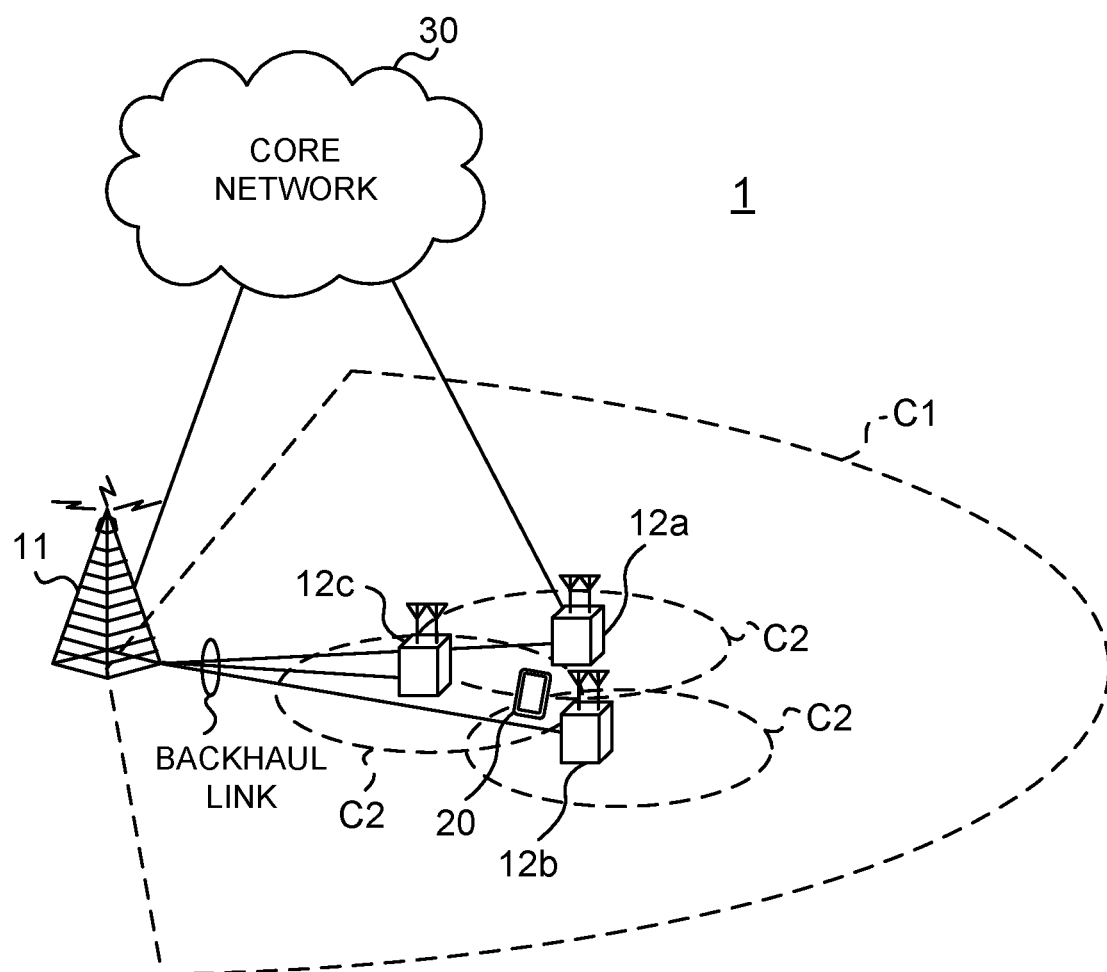
FIG. 14 is a diagram to illustrate an example of a schematic structure of a radio communication system according to one embodiment.

FIG. 14 is a diagram to illustrate an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect illustrated in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 15:
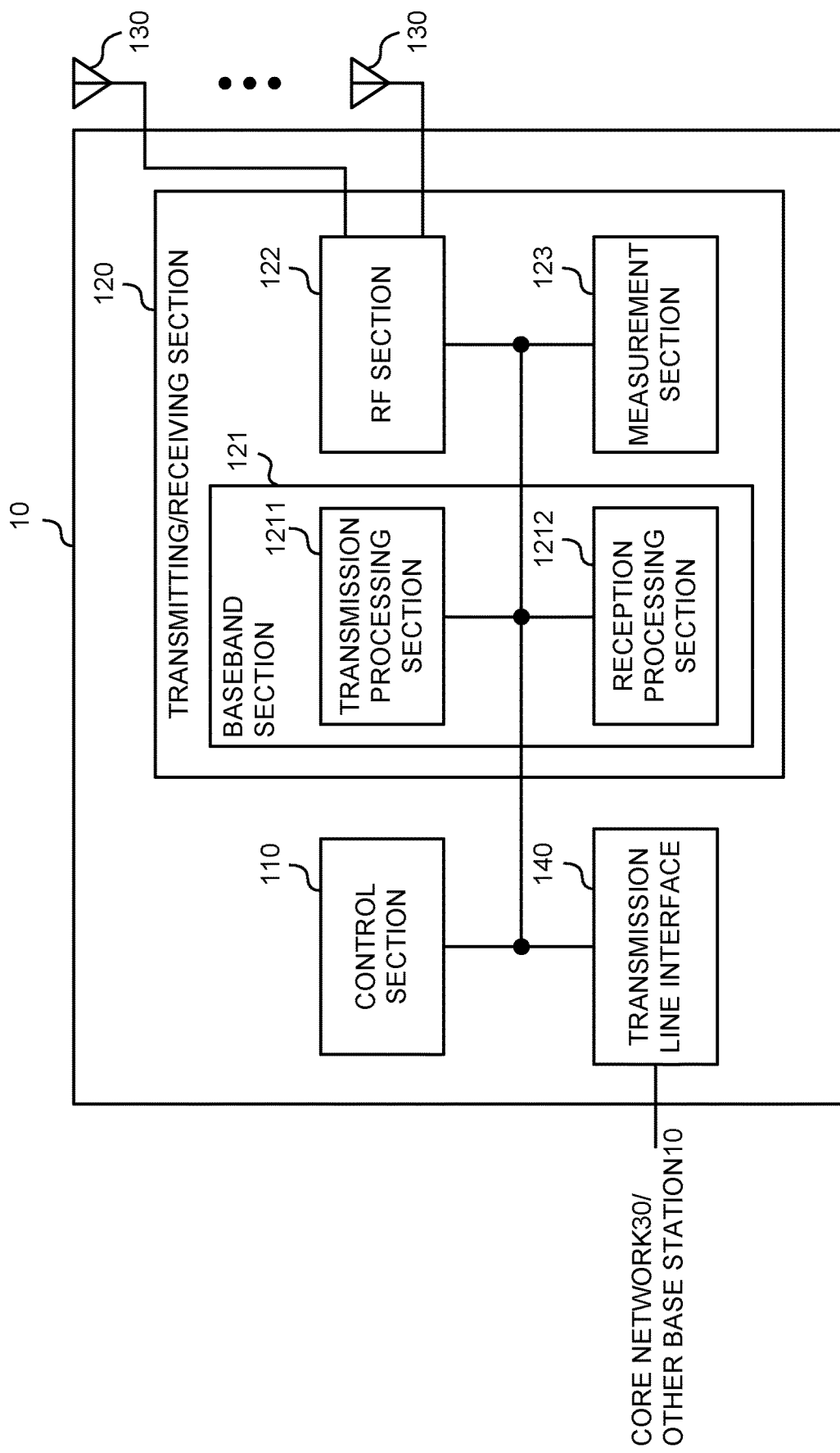
FIG. 15 is a diagram to illustrate an example of a structure of a base station according to one embodiment.

FIG. 15 is a diagram to illustrate an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily illustrates functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit, to the user terminal 20, information for allowing determination of a panel corresponding to a reference signal for measurement (Sounding Reference Signal (SRS)) resource set or an SRS resource (for example, a higher layer parameter such as SRS resource set configuration information or CSI report configuration information).

The transmitting/receiving section 120 may also receive an SRS in the SRS resource set or the SRS resource transmitted by the user terminal 20 by using the determined panel and receive a report for the determined panel corresponding to the SRS resource set or the SRS resource.

Note that the report may include panel information for each SRS resource set or panel information for each SRS resource.

(User Terminal)

Figure 16:
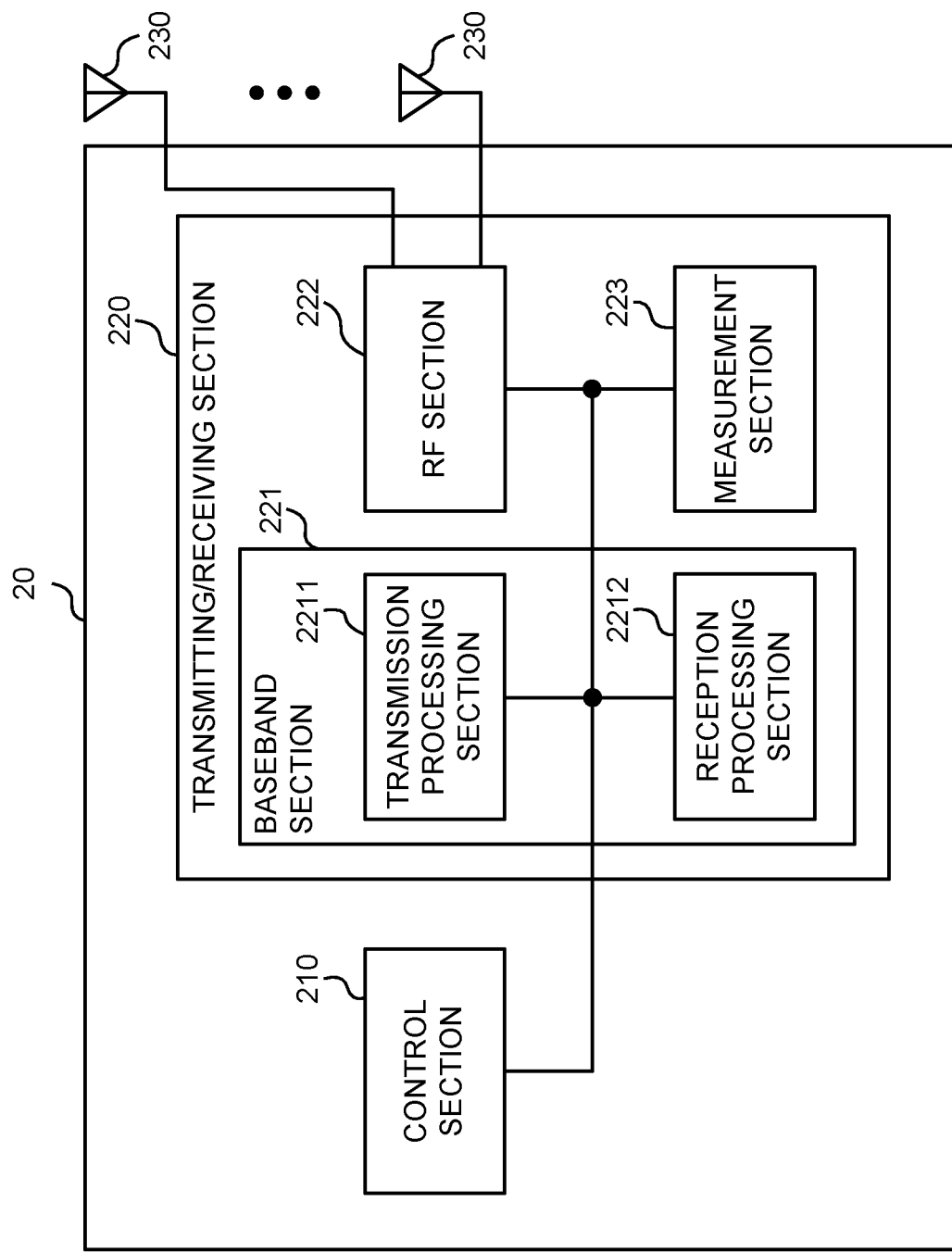
FIG. 16 is a diagram to illustrate an example of a structure of a user terminal according to one embodiment.

FIG. 16 is a diagram to illustrate an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily illustrates functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the control section 210 may determine a panel corresponding to a reference signal for measurement (Sounding Reference Signal (SRS)) resource set or an SRS resource. The determination may be based on information for allowing determination of a panel (for example, a higher layer parameter such as SRS resource set configuration information or CSI report configuration information). The higher layer parameter may include an SRS resource set ID, an SRS resource ID, spatial relation information of an SRS, a panel ID, and the like.

The transmitting/receiving section 220 may also perform SRS transmission in the SRS resource set or the SRS resource by using the determined panel and transmit a report for the determined panel corresponding to the SRS resource set or the SRS resource. Note that these transmissions may be performed in any order or may be performed at the same timing.

The transmitting/receiving section 220 may transmit the report, based on a configuration for a panel report (a CSI report configuration, an SRS report configuration, or the like).

The transmitting/receiving section 220 may transmit the report for the SRS resource set or the SRS resource indicated by (for example, SRSresourceForReport included in) the configuration for the panel report.

The transmitting/receiving section 220 may transmit the report by using a Medium Access Control (MAC) control element, based on a trigger event.

Note that the report may include panel information for each SRS resource set (for example, a panel ID field) or panel information for each SRS resource.

The transmitting/receiving section 220 may transmit the report including an SRS resource set Identifier (ID) and information of a panel for the SRS resource set ID.

The transmitting/receiving section 220 may transmit the report including an SRS resource set Identifier (ID) and information of a panel for each SRS resource in an SRS resource set indicated by the SRS resource set ID.

The transmitting/receiving section 220 may transmit the report including an SRS resource Identifier (ID) and information of a panel for the SRS resource ID.

(Hardware Structure)

Note that the block diagrams that have been used to describe the above embodiments illustrate blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 17:
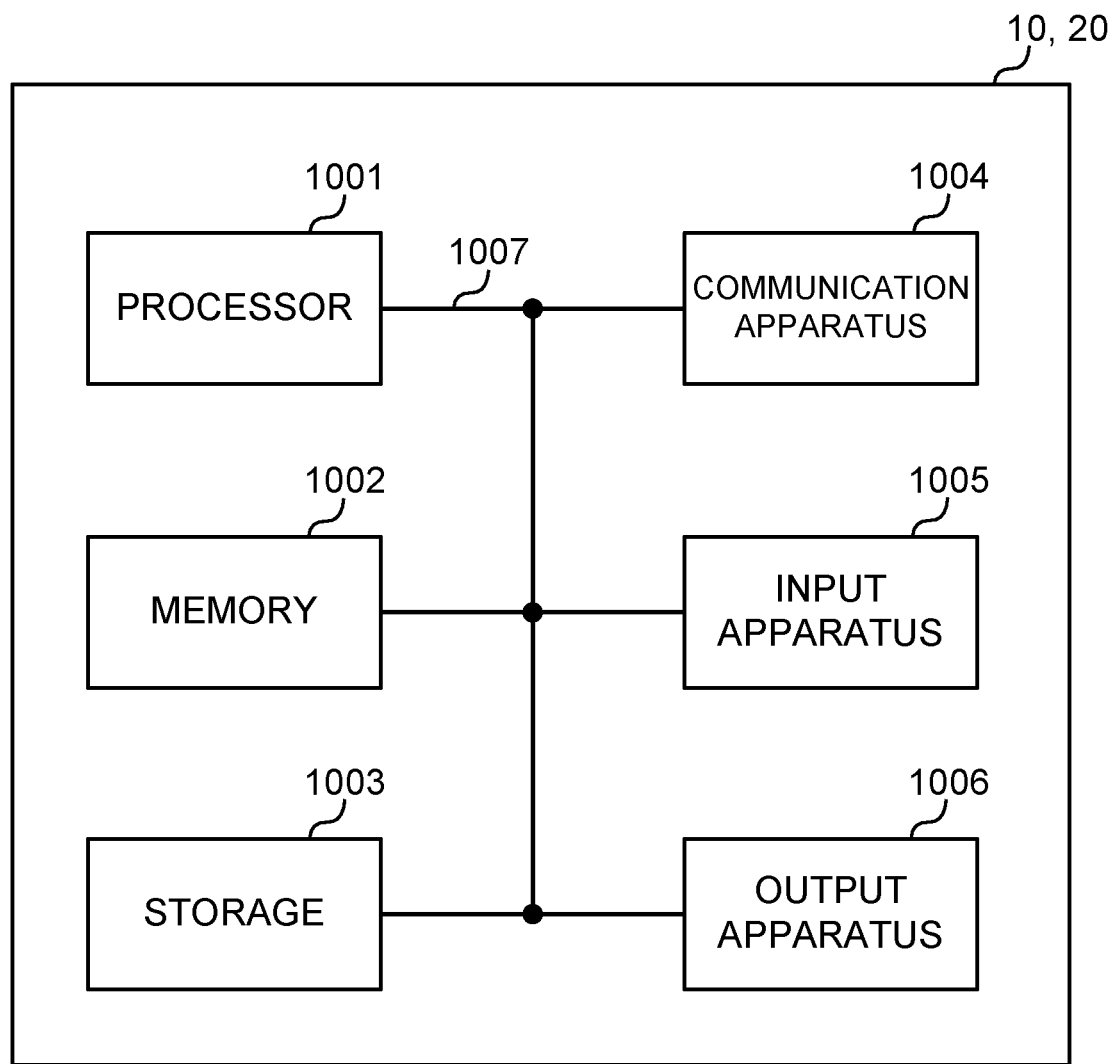
FIG. 17 is a diagram to illustrate an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 17 is a diagram to illustrate an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses illustrated in the drawings, or may be configured not to include part of apparatuses.

For example, although only one processor 1001 is illustrated, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section

120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a processor that reports a Channel State Information (CSI) report including two or more Identifiers (IDs) corresponding to two or more Sounding Reference Signal (SRS) resource sets, respectively, and determines a priority value of the CSI report; and
a transmitter that simultaneously transmits the two or more SRS resource sets by using two or more panels, wherein the processor determines a priority value of a CSI report based on a value of k, wherein k is 0 for a CSI report including Layer 1 Reference Signal Received Power (L1-RSRP) and for a CSI report including Layer 1 Signal-to-Interference-plus-Noise Ratio (L1-SINR), otherwise k is 1, and
the processor determines that the priority value of the CSI report is a same priority value as the CSI report including L1-RSRP,
wherein each of the two or more SRS resource sets corresponds to one of the two or more IDs, and the transmitter transmits the two or more SRS resource sets by using the two or more panels, respectively.

2. A radio communication method for a terminal, comprising:
reporting a Channel State Information (CSI) report including two or more Identifiers (IDs) corresponding to two or more Sounding Reference Signal (SRS) resource sets, respectively;
determining a priority value of the CSI report;
simultaneously transmitting the two or more SRS resource sets by using two or more panels; and
determining a priority value of a CSI report based on a value of k, wherein k is 0 for a CSI report including Layer 1 Reference Signal Received Power (L1-RSRP) and for a CSI report including Layer 1 Signal-to-Interference-plus-Noise Ratio (L1-SINR), otherwise k is 1, and
the method further comprising:
determining that the priority value of the CSI report is a same priority value as the CSI report including L1-RSRP,
wherein each of the two or more SRS resource sets corresponds to one of the two or more IDs, and the two or more SRS resource sets are transmitted by using the two or more panels, respectively.

3. A base station comprising:
a receiver that receives a Channel State Information (CSI) report, from a terminal, including two or more Identifiers (IDs) corresponding to two or more Sounding Reference Signal (SRS) resource sets, respectively, that can be simultaneously transmitted using two or more panels, the terminal determining a priority value of a CSI report based on a value of k, wherein k is 0 for a CSI report including Layer 1 Reference Signal Received Power (L1-RSRP) and for a CSI report including Layer 1 Signal-to-Interference-plus-Noise Ratio (L1-SINR), otherwise k is 1, and the terminal determining that the priority value of the CSI report IDs is a same priority value as the CSI report including L1-RSRP; and
a processor that controls the receiver to receive the two or more SRS resource sets that are simultaneously transmitted from the terminal by using the two or more panels,
wherein each of the two or more SRS resource sets corresponds to one of the two or more IDs, and the receiver receives the two or more SRS resource sets that are transmitted from the terminal using the two or more panels, respectively.

4. A system comprising a terminal and a base station, wherein
the terminal comprises:
a processor that reports a Channel State Information (CSI) report including two or more Identifiers (IDs) corresponding to two or more Sounding Reference Signal (SRS) resource sets, respectively, and determines a priority value of the CSI report; and
a transmitter that simultaneously transmits the two or more SRS resource sets by using two or more panels, wherein
the processor determines a priority value of a CSI report based on a value of k, wherein
k is 0 for a CSI report including Layer 1 Reference Signal Received Power (L1-RSRP) and for a CSI report including Layer 1 Signal-to-Interference-plus-Noise Ratio (L1-SINR), otherwise k is 1, and the processor determines that the priority value of the CSI report is a same priority value as the CSI report including L1-RSRP,
wherein each of the two or more SRS resource sets corresponds to one of the two or more IDs, and the transmitter transmits the two or more SRS resource sets by using the two or more panels, respectively, and
the base station comprises:
    a receiver that receives the two or more SRS resource sets and the CSI report.

* * * * *